Jan. 5, 1960　　　L. D. SNYDER ET AL　　　2,919,925
CHUCK MECHANISM
Filed Jan. 6, 1958
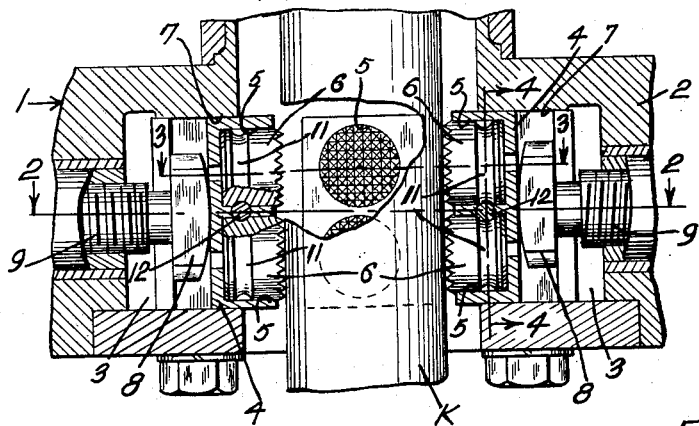
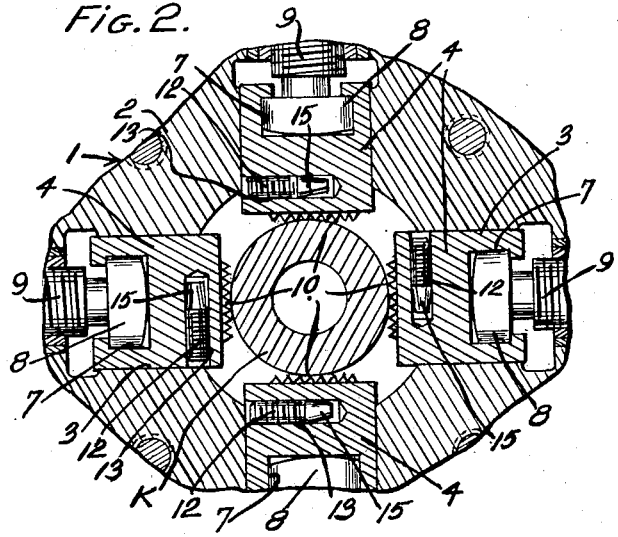
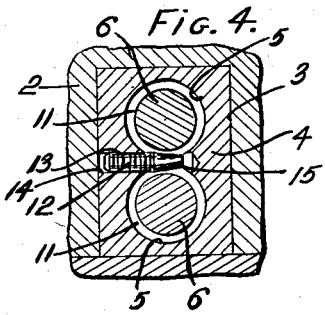
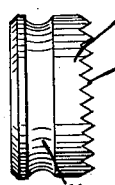
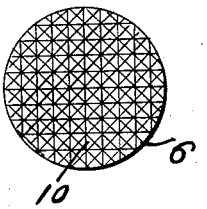
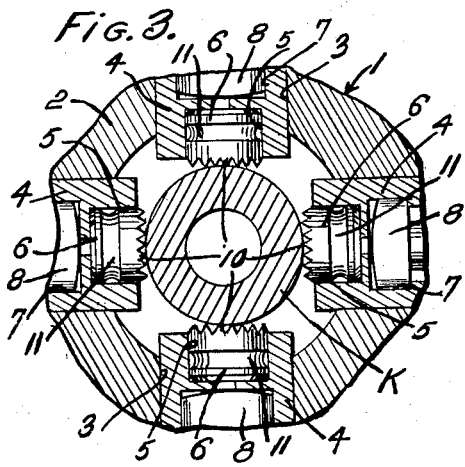
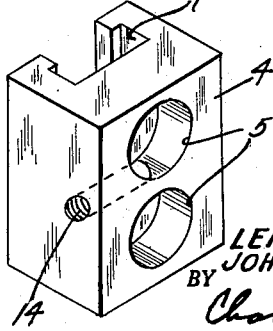
INVENTORS:
LENARD D. SNYDER.
JOHN H. SHAGMAN.
BY Charles F. Osgood,
ATTORNEY.

United States Patent Office 2,919,925
Patented Jan. 5, 1960

2,919,925

CHUCK MECHANISM

Lenard D. Snyder and John H. Shagman, Dallas, Tex., assignors to Joy Manufacturing Company, Pittsburgh, Pa., a corporation of Pennsylvania Application January 6, 1958, Serial No. 707,360

10 Claims. (Cl. 279—123)

This invention relates to chuck mechanisms and more particularly to improved gripping jaw devices for a chuck mechanism of an oil well drill rig.

In oil well drilling, a conventional drill rig is ofttimes employed for driving a round kelly attached to the drill string, and a chuck mechanism is provided for gripping the round kelly for connecting the latter to its feeding and rotating mechanisms. The chuck jaws of such a chuck mechanism often become worn upon use and must frequently be reconditioned or replaced. The present invention contemplates improvements over known types of chucks in that the chuck jaws have serrated gripping faces and are adjustably mounted so that they may be readily repositioned when worn to present unworn gripping teeth to the work. In the present invention, the chuck jaws are in the form of circular hard metal inserts mounted in bores in supports and may be rotated in their bores through 360° relative to their supports thereby enabling repositioning of the gripping teeth through a wide range to vary the gripping action and to increase the useful life of the jaws.

An object of this invention is to provide an improved chuck mechanism. Another object is to provide improved chuck jaw devices for a chuck mechanism. A further object is to provide improved serrated chuck jaws having improved mounting means whereby the jaws may be adjusted through 360° so that when certain of the gripping teeth become worn the jaws may be repositioned to present new relatively unworn teeth to the work. An object is to provide an improved gripping jaw having improved gripping teeth and adjustable through 360° to change the angle of the points of contact between the teeth and the work gripped thereby. Yet another object is to provide an improved chuck jaw of circular formation rotatably received within a bore in a support and having improved means for locking the jaw in any angular position through 360° in its bore. A still further object is to provide an improved combined jaw retaining element and jaw lock whereby a pair of adjacent jaws may be maintained in gripping position. These and other objects and advantages of the invention will, however, hereinafter more fully appear.

In the accompanying drawings there is shown for purposes of illustration one form which the invention may assume in practice.

In these drawings:

Fig. 1 is a central vertical section taken through a chuck mechanism in which a preferred illustrative embodiment of the improved chuck jaws are mounted.

Fig. 2 is a horizontal section taken on line 2—2 of Fig. 1.

Fig. 3 is a horizontal section taken on line 3—3 of Fig. 1.

Fig. 4 is a vertical section taken on line 4—4 of Fig. 1, showing a jaw securing and locking element between a pair of chuck jaws.

Fig. 5 is a side view of one of the chuck jaw inserts.

Fig. 6 is a front view of the jaw insert shown in Fig. 5, looking toward the serrated gripping face.

Fig. 7 is a perspective view of a jaw receiving block.

The chuck mechanism is generally designated 1 and comprises a chuck body 2 having radially located recesses 3 providing guideways in which jaw supporting blocks 4 of rectangular form are radially guided. These supporting blocks at their inner sides each have parallel upper and lower bores 5 for receiving circular bodies of jaw inserts or gripping jaws 6 for gripping a conventional round kelly K. The supporting blocks have vertical recesses 7 of T-shape cross section at their outer sides for receiving T-shaped heads 8 of radially located adjusting screws 9. These screws may be suitably actuated to effect movement of the blocks 4 radially along their guideways to move the jaws toward and from gripping relation with the kelly. Any suitable means may be provided for actuating the screws 9, and the self-locking threads thereof serve to lock firmly the blocks in their adjusted positions.

Now, referring to the improved jaw structure or gripping jaw devices, it will be noted that the circular jaw inserts 6 of hard metal are fitted in the block bores 5 in close adjacency and the gripping serrations or teeth of the griping faces of the jaws are designated 10. These circular inserts are circumferentially annularly grooved at 11. An adjusting screw 12 (Figs. 2 and 4) is tthreaded at 13 within a threaded opening 14 within each supporting block, and each adjusting screw has an inner tapered or wedge-like portion 15. The adjusting screw for each block when adjusted inwardly projects within the annular grooves of the pair of adjacent jaw inserts (Fig. 4) to hold the latter against displacement from the block bores 5, and the screw when further tightened forces its wedge-like portion into frictional engagement with the groove walls firmly to lock the jaw inserts against rotation in the block bores. When the wedge-like portion 15 is loosened, the jaw inserts may be rotated through 360° in their respective bores so that when some of the serrations or gripping teeth become worn other unworn teeth may be presented to the work. Also by rotation of the jaws through 360° the angle of the points of contact of the jaw teeth with the work may be changed to vary the gripping action. Thus, the adjusting screws of the jaw blocks serve the dual functions of a retaining element and a locking element. By completely releasing the adjusting screws of each block, the jaw inserts may be removed from their respective bores for reconditioning or replacement. When the jaws are set in gripping engagement with the sides of the kelly K, the latter is firmly connected for axial and rotative movements with the chuck thereby connecting the latter and the kelly together for both axial and rotative movements. When the jaws are released, the kelly may be moved either upwardly or downwardly and rotated relative to the chuck.

Evidently the chuck jaw devices may have functions other than those disclosed, and may be employed to effect gripping under conditions and in cooperation with elements other than those disclosed.

As a result of this invention, an improved chuck mechanism is provided having improved jaw securing elements whereby the jaw inserts may be firmly maintained and locked in position. By the provision of the circular jaw inserts fitted in bores in supports and rotatable in the bores, the jaws may be angularly positioned through 360° to present their serrated gripping faces in different positions with respect to the work. The single adjusting screw for each pair of jaw inserts not only provides a simple means for maintaining the jaws in their bores, but also provides a quickly and easily adjustable lock for holding the inserts against rotation in their respective bores. The jaw structures are relatively rugged and simple in design, well adapted to meet the demands of service. Other advantages will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What we claim as new and desire to secure by Letters Patent is:

1. In a chuck mechanism, a support having a bore of circular cross section, a chuck jaw insert of circular form fitted in said bore and having serrations on its gripping face, said jaw insert being rotatable through 360° in said bore to change the angle of the points of contact of the serrations to the work, and means for frictionally locking said insert against rotation relative to said support in any position of rotation of said insert.

2. A chuck mechanism as set forth in claim 1, wherein said jaw insert has its circular body circumferentially grooved and said locking means includes an adjustable locking element on said support and engaging the walls of said groove to hold said insert against rotation in any position of rotation thereof.

3. A chuck mechanism as set forth in claim 2, wherein said locking element when in locking engagement with said groove also serves to maintain said jaw insert against axial displacement from its bore.

4. In a chuck mechanism, a supporting block having circular bores disposed in adjacent parallelism, hard metal jaw inserts of circular formation fitted in said bores respectively and having serrated gripping faces, said inserts turnable through 360° in said bores, and a single adjustable securing element carried by said block and having its inner portion extending between said inserts and engaging the latter to lock both inserts against rotation in said bores relative to said block in any position of rotation of said inserts.

5. A chuck mechanism as set forth in claim 4, wherein said circular inserts are annularly circumferentially grooved, and said inner portion of said adjusting element is received in both grooves to maintain both inserts against displacement from their bores.

6. A chuck mechanism as set forth in claim 4, wherein said inner portion of said adjusting element is of wedge-like formation and engages said inserts with a wedging action to hold said inserts against rotation in any position thereof in their respective bores.

7. In combination, a support having a bore, a chuck jaw element having a circular body rotatably received in said bore and provided with a serrated gripping face, said body being circumferentially grooved, and an adjustable securing element on said support and adjustable into engagement with the walls of said groove for maintaining said jaw element in said bore and for locking said jaw element against rotation in its bore relative to said support in any rotated position of said jaw element.

8. A chuck mechanism comprising, in combination, a support having a bore, a chuck jaw element having a circular body received in said bore and provided with a plane serrated face for gripping a round kelly, and means whereby said jaw element may be adjusted through 360° on said support-bore to change the angle of the points of contact of said serrations with the round kelly, said means including means for firmly securing said jaw element in any position of rotation thereof in its bore relative to said support.

9. A chuck mechanism as set forth in claim 4 wherein a bore extends intermediate said parallel bores in parallelism to lines tangential to the inner peripheries of said bores at the adjacent sides of the latter, and said single adjustable securing element having its inner portion extending axially into said intermediate bore into locking contact with the adjacent sides of said inserts.

10. A chuck mechanism as set forth in claim 9 wherein said inserts are annularly grooved about their peripheries and said intermediate bore extends into communication with said grooves and said single securing element is tapered at its inner axially extending portion for wedging contact with the adjacent walls of said grooves to lock both inserts against rotation in the bores in which they are respectively received.

References Cited in the file of this patent

UNITED STATES PATENTS

| 120,910 | Stratton | Nov. 14, 1871 |
| 2,119,731 | Abeggs | June 7, 1938 |